(12) United States Patent
Hao et al.

(10) Patent No.: US 12,541,694 B2
(45) Date of Patent: Feb. 3, 2026

(54) GENERATING A DOMAIN-SPECIFIC KNOWLEDGE GRAPH FROM UNSTRUCTURED COMPUTER TEXT

(71) Applicant: FMR LLC, Boston, MA (US)

(72) Inventors: Hua Hao, Dalian (CN); Tieyi Guo, Plano, TX (US); Byung Chun, Kingston, MA (US); Wenbin Ren, Dalian (CN); Yan Yu, Dalian (CN)

(73) Assignee: FMR LLC, Boston, MA (US)

( * ) Notice: Subject to any disclaimer, the term of this patent is extended or adjusted under 35 U.S.C. 154(b) by 1394 days.

(21) Appl. No.: 17/105,131

(22) Filed: Nov. 25, 2020

(65) Prior Publication Data

US 2022/0164683 A1 May 26, 2022

(51) Int. Cl.

| | |
|---|---|
| *G06N 5/04* | (2023.01) |
| *G06F 16/25* | (2019.01) |
| *G06F 16/93* | (2019.01) |
| *G06F 40/295* | (2020.01) |
| *G06N 3/08* | (2023.01) |
| *G06N 5/02* | (2023.01) |
| *H04L 51/02* | (2022.01) |

(52) U.S. Cl.
CPC ............. *G06N 5/04* (2013.01); *G06F 16/252* (2019.01); *G06F 16/93* (2019.01); *G06F 40/295* (2020.01); *G06N 3/08* (2013.01); *G06N 5/02* (2013.01); *H04L 51/02* (2013.01)

(58) Field of Classification Search
None
See application file for complete search history.

(56) References Cited

U.S. PATENT DOCUMENTS

| | | |
|---|---|---|
| 8,407,253 B2 | 3/2013 | Ryu et al. |
| 10,073,840 B2 | 9/2018 | Hakkani-Tur et al. |
| 10,229,195 B2 | 3/2019 | Ho et al. |
| | (Continued) | |

OTHER PUBLICATIONS

Smith, Sentiment Analysis of Patient Feedback, Doctoral Thesis, University of Birmingham, Dec. 2015, pp. 1-286 (Year: 2015).*

(Continued)

*Primary Examiner* — Wilbert L Starks
(74) *Attorney, Agent, or Firm* — Cesari and McKenna, LLP

(57) ABSTRACT

Methods and apparatuses are described for generating a domain-specific knowledge graph from unstructured computer text. A computing device extracts unstructured computer text associated with pairs of entities from domain-independent documents, and trains an entity relationship classification model using a domain-independent knowledge graph and the extracted text. The computing device extracts other unstructured text associated with a first domain from domain-specific documents. The computing device identifies pairs of entities contained within the text for the first domain, and executes the trained model to determine a relationship between the entities in each pair of entities identified from the text for the first domain. The computing device generates a domain-specific knowledge graph using (i) the pairs of entities identified from the text for the first domain and (ii) the relationships between the entities in each pair of entities identified from the text for the first domain.

20 Claims, 9 Drawing Sheets

(56) References Cited

U.S. PATENT DOCUMENTS

| | | |
|---|---|---|
| 11,394,799 B2 † | 7/2022 | Jackson |
| 2018/0039696 A1 | 2/2018 | Zhai et al. |
| 2019/0294732 A1 | 9/2019 | Srinivasan et al. |
| 2019/0303498 A1 | 10/2019 | Saha et al. |

OTHER PUBLICATIONS

Chakraborty, et al., Introduction to Neural Network-Based Question Answering Over Knowledge Graphs, WIREs Data Mining and Knowledge Discovery, Aug. 13, 2020, pp. 1-25 (Year: 2020).*

Mintz, M. et al., "Distant supervision for relation extraction without labeled data," Proceedings of the Joint Conference of the 47th Annual Meeting of the ACL and the 4th IJCNLP of the AFNLP, Suntec, Singapore, Aug. 2-7, 2009, pp. 1003-1011, available at https://www.aclweb.org/anthology/P09-1113.pdf.

Mikolov, T. et al., "Distributed Representations of Words and Phrases and their Compositionality," arXiv:1310.4546 [cs.CL], Oct. 16, 2013, 9 pages, available at https://arxiv.org/pdf/1310.4546.

Bojanowski, P. et al., "Enriching Word Vectors with Subword Information," arXiv:1607.04606v2 [cs.CL], Jun. 19, 2017, 12 pages, available at https://arxiv.org/pdf/1607.04606.

Devlin, J. et al., "BERT: Pre-training of Deep Bidirectional Transformers for Language Understanding," arXiv:1810.04805 [cs.CL], May 24, 2019, 16 pages, available at https://arxiv.org/pdf/1810.04805.

Radford, A. et al., "Language Models are Unsupervised Multitask Learners," published 2019, 24 pages, available at https://d4mucfpksywv.cloudfront.net/better-language-models/language-models.pdf.

Vaswani, A. et al., "Attention Is All You Need," arXiv:1706.03762 [cs.CL], Dec. 6, 2017, 15 pages, available at https://arxiv.org/pdf/1706.03762.

Lecun, Y. et al., "Gradient-Based Learning Applied to Document Recognition," Proceedings of the IEEE 86(11):2278-2324, Nov. 1998, DOI: 10.1109/5.726791, 46 pages.

Surdeanu, M. et al., "Multi-instance Multi-label Learning for Relation Extraction," Proceedings of the 2012 Joint Conference on Empirical Methods in Natural Language Processing and Computational Natural Language Learning, pp. 455-465, Jeju Island, Korea, Jul. 12-14, 2012.

Graves, A. and Scmidhuber, J., "Framewise Phoneme Classification with Bidirectional LSTM Networks," 2005 EEE International Joint Conference on Neural Networks (IJCNN), Jul. 31-Aug. 4, 2005, Montreal, Quebec, available at https://www.cs.toronto.edu/~graves/ijcnn_2005.pdf, 6 pages.

Lafferty, J. et al., "Conditional Random Fields: Probabilistic Models for Segmenting and Labeling Sequence Data," Proceedings of the 18th International Conference on Machine Learning 2001 (ICML 2001), Jun. 2001, pp. 282-289, available at http://repository.upenn.edu/cis_papers/159.

\* cited by examiner
† cited by third party

GENERATING A DOMAIN-SPECIFIC KNOWLEDGE GRAPH FROM UNSTRUCTURED COMPUTER TEXT

TECHNICAL FIELD

This application relates generally to methods and apparatuses, including computer program products, for generating a domain-specific knowledge graph from unstructured computer text.

BACKGROUND

With the rise of computing devices such as smartphones, tablets, and Internet of Things (IoT) devices that offer constant connectivity, activity monitoring and data capture, companies have endeavored to capture a wide range of user-specific information in order to provide personalized data delivery, recommendations and service to their customers. In one example, a customer use an app on their smartphone to connect to a company's automated chatbot system to ask questions and receive accurate information in response. As the user types in questions, the chatbot system automatically parses the user's questions to determine the intent of the questions and the most relevant responses to the questions in real time or near real time.

In many existing data delivery systems such as chatbot systems, digital documents that comprise unstructured computer text are a common information carrier—such as descriptions about products and services that may enhance a user's experience. Continuing with the above example, a user may inquire about a specific product type or product offering—such as "What kinds of mutual funds do you offer?"—and the chatbot system can return a digital brochure (or link to a webpage) that contains information in response to the user's questions.

However, it is difficult to automatically, quickly and efficiently parse through a large corpus of domain-specific digital documents in order to provide accurate results. Many systems utilize multidimensional data structures, such as knowledge graphs, to store and associate document-related information into a domain-specific paradigm—which enables fast and accurate location of specific digital documents. In one example, recommender systems often take advantage of knowledge graphs to provide targeted content suggestions to each user. These knowledge graphs are often built using specialized, complex computing techniques such as machine learning classification modeling, neural networks, and data vectorization.

One high-profile example of a knowledge graph is Google™ Knowledge Graph, which provides auxiliary information to users in conjunction with search results. For example, when a user searches for a specific topic or subject, the Google™ Knowledge Graph presents a knowledge panel in proximity to the related search results, where the knowledge panel contains facts, data, and other types of information—determined by the Knowledge Graph to be related to or associated with the searched-for topic or subject in some way—that may be relevant to and of interest to the user. However, data structures like Google™ Knowledge Graph take significant amounts of time (i.e., years), effort, and cost to generate, and often lack the capability to provide domain-specific results. For example, each company's corpus of existing digital information (such as digital documents) may utilize terminology in different ways, and/or companies may desire specific associations between keywords, topics, and/or subjects that other companies do not want. Therefore, trying to utilize a one-size-fits-all general knowledge graph data structure for a company's domain-specific digital information does not typically produce accurate, personalized content recommendations and information delivery to the company's customers. In one example, Google™ Knowledge Graph provides a free search API but is limited to 100,000 read calls per day per project, and returns only individual matching entities, rather than graphs of interconnected entities. Another example is Wikidata, which is a free and collaborative structured database and provide free search API with unlimited times. But, Wikidata is maintained by editors and automated bots which cannot provide rapid and effective updates in various domains. In addition, as a knowledge graph grows in scope and coverage, it typically requires increased effort in building and maintaining the graph.

SUMMARY

Therefore, what is needed are methods and systems that provide for the generation of multidimensional domain-specific knowledge graph data structures that identify specific relationships between entities in the domain and comprise association to categories of digital documents, in order to provide seamless digital document identification and delivery to end users interacting with automated computing systems. The techniques described herein advantageously leverage existing corpuses of domain-independent digital information in order to train artificial intelligence-based classification models to identify entity relationships in a corpus of domain-specific documents—which enables rapid and efficient creation of the domain-specific knowledge graph.

The invention, in one aspect, features a system for generating a domain-specific knowledge graph from unstructured computer text. The system comprises a computer data store including (i) a plurality of domain-specific documents, each document comprising unstructured computer text associated with a first domain (ii) a domain-independent knowledge graph comprising a plurality of pairs of entities, each pair including a relationship between the entities in the pair, and (iii) a plurality of domain-independent documents, each document comprising unstructured computer text associated with one or more of the plurality of pairs of entities. The system further comprises a computing device coupled to the computer data store, the computing device including a memory that stores computer-executable instructions and a processor that executes the computer-executable instructions. The computing device extracts the unstructured computer text associated with one or more of the plurality of pairs of entities from at least a portion of the plurality of domain-independent documents. The computing device trains an entity relationship classification model using the domain-independent knowledge graph and the unstructured computer text extracted from the at least a portion of the plurality of domain-independent documents, the entity relationship classification model configured to identify entity relationships contained in input data received by the model. The computing device extracts the unstructured computer text associated with the first domain from at least a portion of the plurality of domain-specific documents and combine the extracted unstructured computer text into a corpus of unstructured computer text for the first domain. The computing device identifies, using a named entity recognition model, a plurality of pairs of entities contained within the corpus of unstructured computer text for the first domain, each pair of entities located in one or more sentences of the corpus of unstructured computer text. The computing device executes the trained entity relationship classification model, with input of (i) the plurality of pairs of entities identified from the corpus of unstructured computer text for the first domain and (ii) the sentences for each of the plurality of pairs of entities identified from the corpus of unstructured computer text for the first domain, to determine a relationship between the entities in each pair of the plurality of pairs of entities identified from the corpus of unstructured computer text for the first domain. The computing device generates a domain-specific knowledge graph using (i) the plurality of pairs of entities identified from the corpus of unstructured computer text for the first domain and (ii) the relationship between the entities in each pair of the plurality of pairs of entities identified from the corpus of unstructured computer text for the first domain. The domain-specific knowledge graph comprises a multidimensional data structure where each entity in the plurality of pairs of entities identified from the corpus of unstructured computer text for the first domain is a node in the domain-specific knowledge graph, and the relationship between the entities in each pair the plurality of pairs of entities identified from the corpus of unstructured computer text for the first domain is a connection between the nodes for those entities in the domain-specific knowledge graph.

The invention, in another aspect, features a computerized method of generating a domain-specific knowledge graph from unstructured computer text. A computer data store stores (i) a plurality of domain-specific documents, each document comprising unstructured computer text associated with a first domain (ii) a domain-independent knowledge graph comprising a plurality of pairs of entities, each pair including a relationship between the entities in the pair, and (iii) a plurality of domain-independent documents, each document comprising unstructured computer text associated with one or more of the plurality of pairs of entities. A computing device coupled to the computer data store extracts the unstructured computer text associated with one or more of the plurality of pairs of entities from at least a portion of the plurality of domain-independent documents. The computing device trains an entity relationship classification model using the domain-independent knowledge graph and the unstructured computer text extracted from the at least a portion of the plurality of domain-independent documents, the entity relationship classification model configured to identify entity relationships contained in input data received by the model. The computing device extracts the unstructured computer text associated with the first domain from at least a portion of the plurality of domain-specific documents and combine the extracted unstructured computer text into a corpus of unstructured computer text for the first domain. The computing device identifies, using a named entity recognition model, a plurality of pairs of entities contained within the corpus of unstructured computer text for the first domain, each pair of entities located in one or more sentences of the corpus of unstructured computer text. The computing device executes the trained entity relationship classification model, with input of (i) the plurality of pairs of entities identified from the corpus of unstructured computer text for the first domain and (ii) the sentences for each of the plurality of pairs of entities identified from the corpus of unstructured computer text for the first domain, to determine a relationship between the entities in each pair of the plurality of pairs of entities identified from the corpus of unstructured computer text for the first domain. The computing device generates a domain-specific knowledge graph using (i) the plurality of pairs of entities identified from the corpus of unstructured computer text for the first domain and (ii) the relationship between the entities in each pair of the plurality of pairs of entities identified from the corpus of unstructured computer text for the first domain. The domain-specific knowledge graph comprises a multidimensional data structure where each entity in the plurality of pairs of entities identified from the corpus of unstructured computer text for the first domain is a node in the domain-specific knowledge graph, and the relationship between the entities in each pair the plurality of pairs of entities identified from the corpus of unstructured computer text for the first domain is a connection between the nodes for those entities in the domain-specific knowledge graph.

Any of the above aspects can include one or more of the following features. In some embodiments, extracting the unstructured computer text associated with one or more of the plurality of pairs of entities from at least a portion of the plurality of domain-independent documents comprises segmenting each document in the at least a portion of the plurality of domain-independent documents into a plurality of sentences. In some embodiments, training the entity relationship classification model using the domain-independent knowledge graph and the unstructured computer text extracted from the at least a portion of the plurality of domain-independent documents comprises: selecting seed entities from the domain-independent knowledge graph; identifying a plurality of pairs of entities from the domain-independent knowledge graph using the seed entities; capturing sentences from the plurality of domain-independent documents that are associated with the identified plurality of pairs of entities from the domain-independent knowledge graph; determining the relationship in each pair of the identified plurality of pairs of entities from the domain-independent knowledge graph based upon the captured sentence from the plurality of domain-independent documents that is associated with the pair; and training the entity relationship classification model using as input (i) the identified plurality of pairs of entities from the domain-independent knowledge graph, (ii) the determined relationships between each pair of the identified plurality of pairs of entities from the domain-independent knowledge graph, and (iii) captured sentences from the plurality of domain-independent documents that are associated with the identified plurality of pairs of entities from the domain-independent knowledge graph. In some embodiments, capturing sentences from the plurality of domain-independent documents is based upon a distant supervision algorithm.

In some embodiments, extracting the unstructured computer text associated with the first domain from at least a portion of the plurality of domain-specific documents comprises segmenting each document in the at least a portion of the plurality of domain-specific documents into a plurality of sentences. In some embodiments, identifying, using the named entity recognition model, a plurality of pairs of entities contained within the corpus of unstructured computer text for the first domain comprises: converting, by a word embedding layer of the named entity recognition model, each word of the sentences of the corpus of unstructured computer text for the first domain into a multidimensional vector in a multidimensional vector space comprising a plurality of nodes, each node in the multidimensional vector space corresponding to a word from the corpus of unstructured computer text for the first domain; and classifying, by a recurrent neural network of the named entity recognition model, one or more of the multidimensional vectors of the multidimensional vector space as an entity. In some embodiments, the recurrent neural network of the named entity recognition model comprises a bi-directional long short-term memory (Bi-LSTM) layer. In some embodiments, the named entity recognition model comprises a conditional random fields (CRF) layer that adjusts the entity classification applied by the recurrent neural network to one or more of the multidimensional vectors.

In some embodiments, executing the trained entity relationship classification model to determine a relationship between the entities in each pair of the plurality of pairs of entities identified from the corpus of unstructured computer text for the first domain comprises: converting, by an embedding layer of the trained entity relationship classification model, each sentence for each of the plurality of pairs of entities identified from the corpus of unstructured computer text for the first domain into a multidimensional vector; assigning, by the embedding layer, a position embedding value to each multidimensional vector associated with each sentence for each of the plurality of pairs of entities identified from the corpus of unstructured computer text for the first domain, the position embedding value associated with a relative location between each word and the pair of entities in the sentence; calculating, by a convolutional neural network of the trained entity relationship classification model, one or more features of each sentence identified from the corpus of unstructured computer text for the first domain based upon the multidimensional vector and the position embedding value associated with the sentence; assigning, by a classification layer of the trained entity relationship classification model, each sentence to an entity pair bag based upon the calculated features of the sentence; and predicting, by the classification layer, a relationship of the entity pairs based on the entity pair bag to which the entity pair is assigned. In some embodiments, the convolutional neural network is a piecewise convolutional neural network. In some embodiments, predicting a relationship of the entity pairs based on the entity pair bag to which the entity pair is assigned comprises: generating, by the classification layer, a score associated with the relationship between the pair of entities; and assigning, by the classification layer, the relationship between the pair of entities based upon the score.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
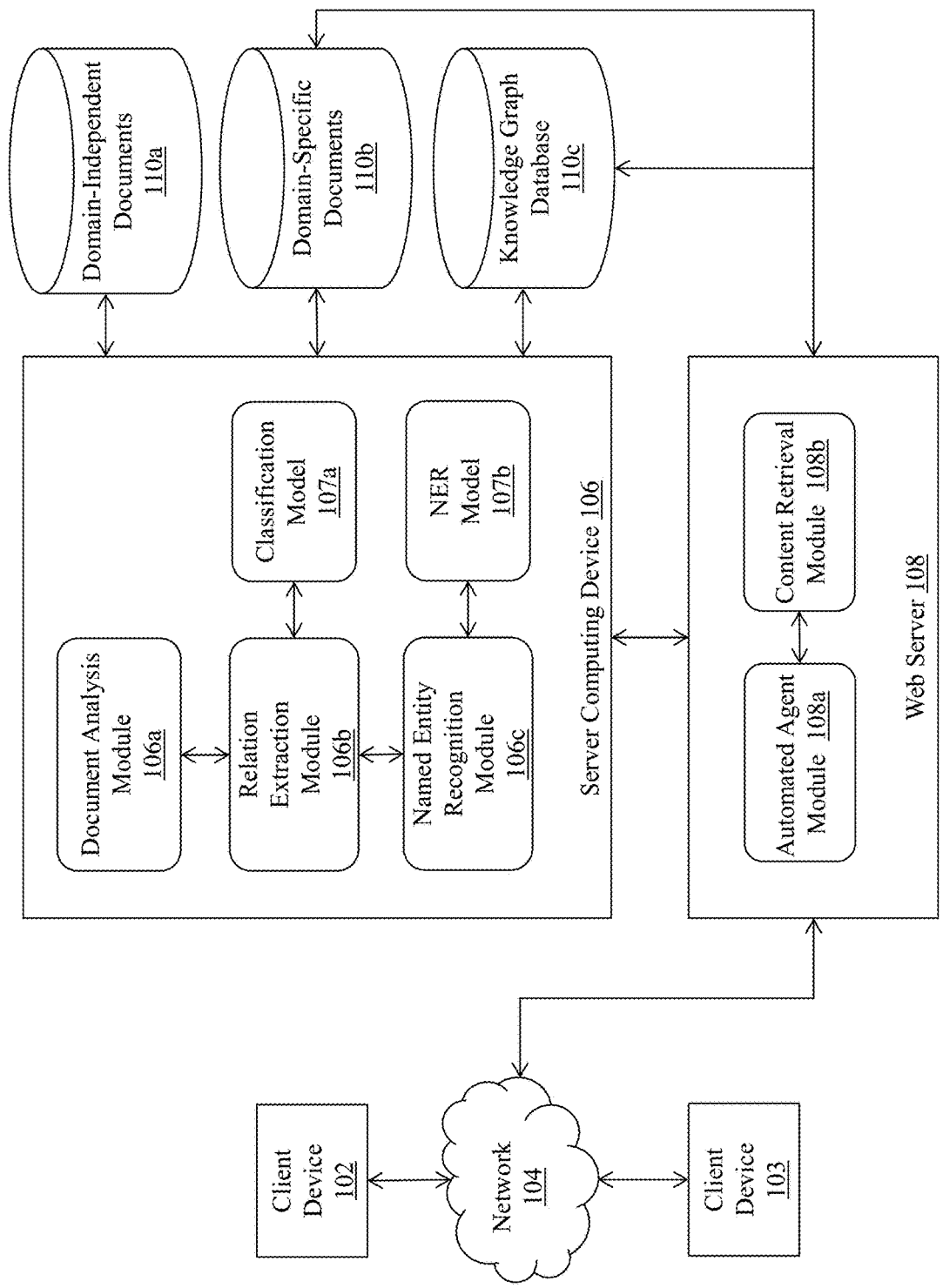
FIG. 1 is a block diagram of a system for generating a domain-specific knowledge graph from unstructured computer text.

FIG. 1 is a block diagram of a system 100 for generating a domain-specific knowledge graph from unstructured computer text. The system 100 includes a client computing device 102, a client computing device 103, a communication network 104, a server computing device 106 that includes a document analysis module 106a, a relation extraction module 106b coupled to a classification model 107a, a named entity recognition (NER) module 106c coupled to a NER model 107b, a web server 108 with an automated agent module 108a and a content retrieval module 108b, and a plurality of databases—a domain-independent document database 110a, a domain-specific document database 110b and a knowledge graph database 110c.

The client computing devices 102, 103 connect to the communication network 104 in order to communicate with the server computing device 106 and the web server 108 to provide input and receive output relating to the process of generating a domain-specific knowledge graph from unstructured computer text as described herein. In some embodiments, the client computing devices 102, 103 are each coupled to an associated display device (not shown). For example, client computing devices 102, 103 can provide a graphical user interface (GUI) via the display device that is configured to receive input from a user of the device 102, 103 and to present output (e.g., digital content items) to the user that results from the methods and systems described herein.

Exemplary client computing devices 102, 103 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts two client computing devices 102, 103, it should be appreciated that the system 100 can include any number of client computing devices.

The communication network 104 enables the client computing devices 102, 103 to communicate with the server computing device 106 and the web server 108. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for generating a domain-specific knowledge graph from unstructured computer text as described herein. The server computing device 106 includes a document analysis module 106a, a relation extraction module 106b coupled to a classification model 107a, a named entity recognition (NER) module 106c coupled to a NER model 107b, that execute on the processor of the server computing device 106. In some embodiments, the modules 106a, 106b, 106c, 107a, and 107b are specialized sets of computer software instructions programmed onto one or more dedicated processors in the server computing device 106 and can include specifically-designated memory locations and/or registers for executing the specialized computer software instructions.

Although the modules 106a, 106b, 106c, 107a, and 107b are shown in FIG. 1 as executing within the same server computing device 106, in some embodiments the functionality of the modules 106a, 106b, 106c, 107a, and 107b can be distributed among a plurality of server computing devices. As shown in FIG. 1, the server computing device 106 enables the modules 106a, 106b, 106c, 107a, and 107b to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106a, 106b, 106c and 107 is described in detail below.

The web server 108 is a computing device (or set of computing devices) to which the client computing devices 102, 103 can connect to initiate and conduct communication sessions for the exchange of information (such as text chat sessions) and the receipt of digital content items (such as documents, web pages, and the like) in response to user requests originating at the client device 102, 103. The web server 108 is a combination of hardware, including one or more special-purpose processors and one or more physical memory modules, and specialized software modules (such as automated agent module 108a and content retrieval module 108b) that are executed by a processor of the web server 108. In some embodiments, the web server 108 is an online content platform (such as a website host) that provides certain digital content objects (e.g., text content such as documents, articles, web pages, etc.) to the client device 102, 103. Typically, a website comprises a plurality of visual and non-visual elements that make up the content transmitted and displayed to a user when, e.g., browser software on the client computing device 102, 103 connects to the web server 108 via a communication network 104 (e.g., Internet) and initiates a communication session with the web server 108. The elements of a website include, but are not limited to, webpages (e.g., HTML documents), image files, layouts, color sets, stylesheets, document object models (DOM), tracking elements, metadata, URLs, and content (e.g., text, audio, video).

In one example, a user at client device 102 can execute an app installed on the client device to initiate a text chat session with automated agent module 108a of web server 108—e.g., for the purpose of asking questions and obtaining information from the automated agent module 108a. In one embodiment, the automated agent module 108a can be a chatbot program that is configured to receive text messages from an app on client devices 102, 103, analyze the received text messages to determine an appropriate response, and automatically generate a text message that responds to the client message(s). In some cases, the automated agent module 108a can communicate with the content retrieval module 108b to identify and retrieve relevant digital content (documents, articles, webpages, etc.) that are responsive to the text messages received from the client devices 102, 103. The automated agent module 108a can identify particular keywords, entities, or concepts in the client text messages and then traverse a domain-specific knowledge graph to determine other entities in the knowledge graph that share a relationship to the identified keywords, entities or concepts. Using these determined relationships, the content retrieval module 108b can access the domain-specific database 110b to retrieve digital content that encapsulates or relates to the entities and their relationships, and return the digital content to the automated agent module 108a for transmission to the client devices 102, 103 in response to a text message. For example, the automated agent module 108a can respond to the client devices 102, 103 with a text message containing a hyperlink that points to a web address containing the relevant digital content for download to and display on the client devices 102, 103. Further detail about the operation of the content identification and retrieval process is provided below.

The databases 110a-110c are located on a computing device (or in some embodiments, on a set of computing devices) coupled to the server computing device 106 and content delivery server 108 and the databases are configured to receive, generate, and store specific segments of data relating to the process of generating a domain-specific knowledge graph from unstructured computer text as described herein. In some embodiments, all or a portion of the databases 110a-110c can be integrated with the server computing device 106, the web server 108, or be located on a separate computing device or devices. The databases 110a-110c can comprise one or more databases configured to store portions of data used by the other components of the system 100, as will be described in greater detail below. An exemplary database 110a-110c is MySQL™ available from Oracle Corp. of Redwood City, California.

In some embodiments, the domain-independent document database 110a comprises digital documents (and/or pointers to digital documents stored on one or more remote computing devices) that do not specifically relate to a singular domain (i.e., the domain of the company that manages and controls the domain-specific documents). In one example, the domain-independent document database 110a can comprise a plurality of public domain documents, such as Wikipedia™ pages (as obtained from www.wikipedia.org). Further information about the selection of domain-independent documents for use in the domain-independent document database 110a is provided below.

In some embodiments, the domain-specific document database 110b comprises digital documents (and/or pointers to digital documents stored on one or more remote computing devices) that relate specifically to a particular domain (i.e., the domain of a company). For example, a financial services company may generate, maintain, and control a plurality of documents that are specific to a particular domain (such as financial products, financial services, and/or the company as a whole)—these documents may include references to entities that are unique to the domain and/or identify relationships between entities that are unique to the domain. Further information about the selection of domain-specific documents for use in the domain-specific document database 110b is provided below.

In some embodiments, the knowledge graph database 110c comprises one or more multidimensional data structures made up of entities (also called nodes) and relationships (also called edges) that connect the nodes. Generally, the entities in a knowledge graph comprise one or more characteristics and the relationships in the knowledge graph connect two entities based upon a semantic relationship between the two entities in text. In some embodiments, the knowledge graph database 110c comprises a domain-independent knowledge graph that is retrieved from an external data source and a domain-specific knowledge graph that is generated by the system 100 as described herein. In one example, the domain-independent knowledge graph can comprise a publicly-available knowledge graph (such as Wikidata—www.wikidata.org) that comprises structured data associated with a corpus of domain-independent documents (i.e., Wikipedia pages). The system 100 can leverage the structured data of Wikidata to generate a domain-independent knowledge graph that can then be traversed to identify Wikipedia pages that are relevant to each relationship in the domain-independent knowledge graph. In some embodiments, the domain-specific knowledge graph is selected based on the relationships of interest and the efforts to collect related documents of entities to be utilized from this knowledge graph. Generally, the domain-independent knowledge graph should contain all kinds of interested relationships, so that the system 100 can get entity pairs samples with the interested relationships to prepare training data for further relation extraction. It can be advantageous if the domain-independent knowledge graph is in a similar domain to the domain of interest, to improve efficiency and performance of the system 100. The domain-independent knowledge graph can also be the combination of several knowledge graphs, for example, if all kinds of interested relationships cannot be determined from a single domain-independent knowledge graph. Because it offers many different kinds of relationships and streamlines efforts to collect its entity pairs-related documents, the system 100 in one embodiment uses Wikidata (which has about 6,000 kinds of relationships, and most entities have links to Wikipedia documents).

In some embodiments, the knowledge graph database 110c further combines with the domain-specific knowledge graph that is generated using the techniques described herein. Further information on the structure of and generation of the knowledge graphs is provided below.

Figure 2:
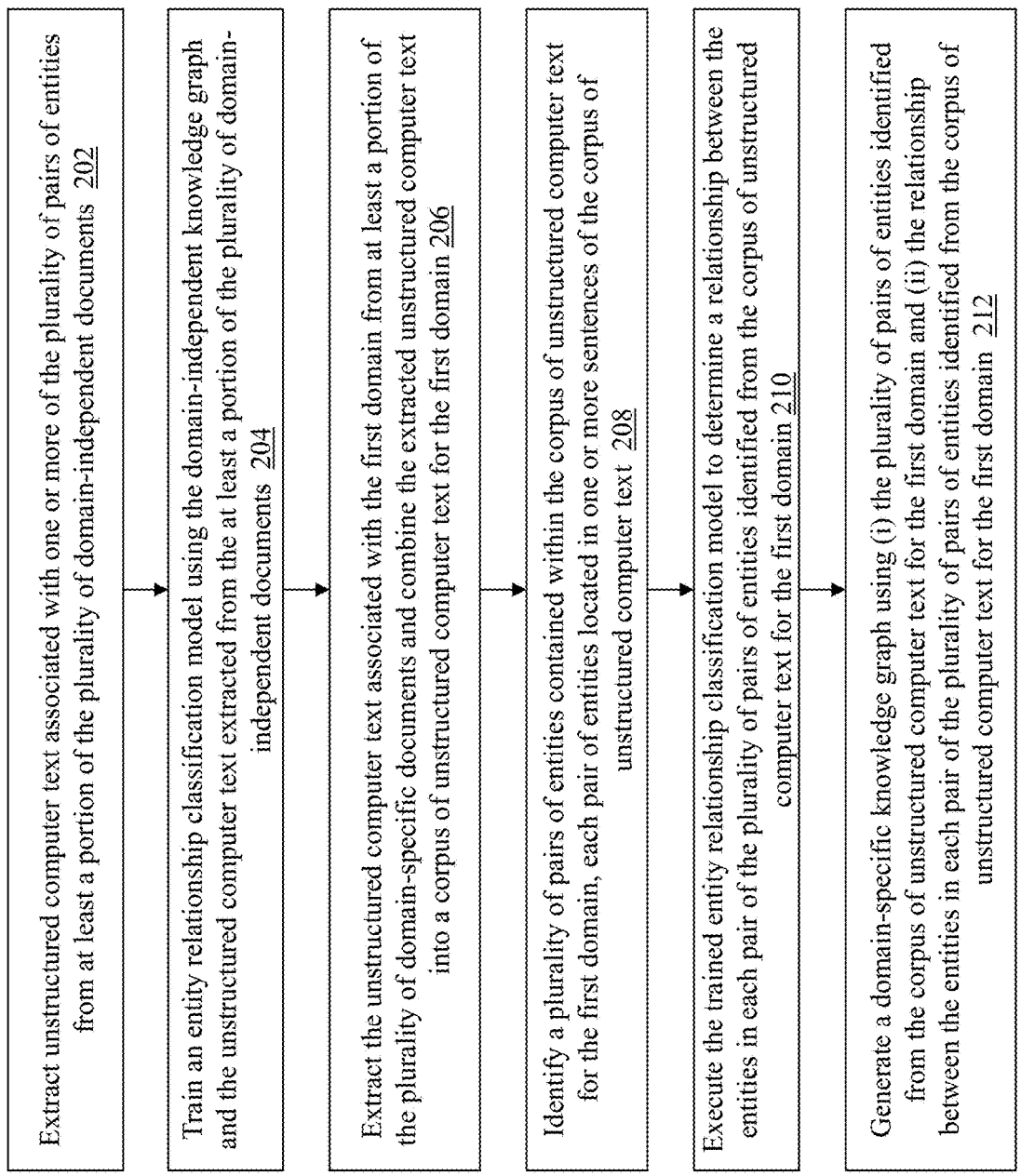
FIG. 2 is a flow diagram of a computerized method of generating a domain-specific knowledge graph from unstructured computer text.

FIG. 2 is flow diagram of a computerized method 200 of generating a domain-specific knowledge graph from unstructured computer text, using the system 100 of FIG. 1. Generally, the method of generating a domain-specific knowledge graph that is described herein comprises several different phases, including a document analysis and entity relationship classification model training phase, a named entity recognition (NER) model training phase, and a domain-specific knowledge graph generation phase. Each of these phases is described in greater detail below.

Figure 3:
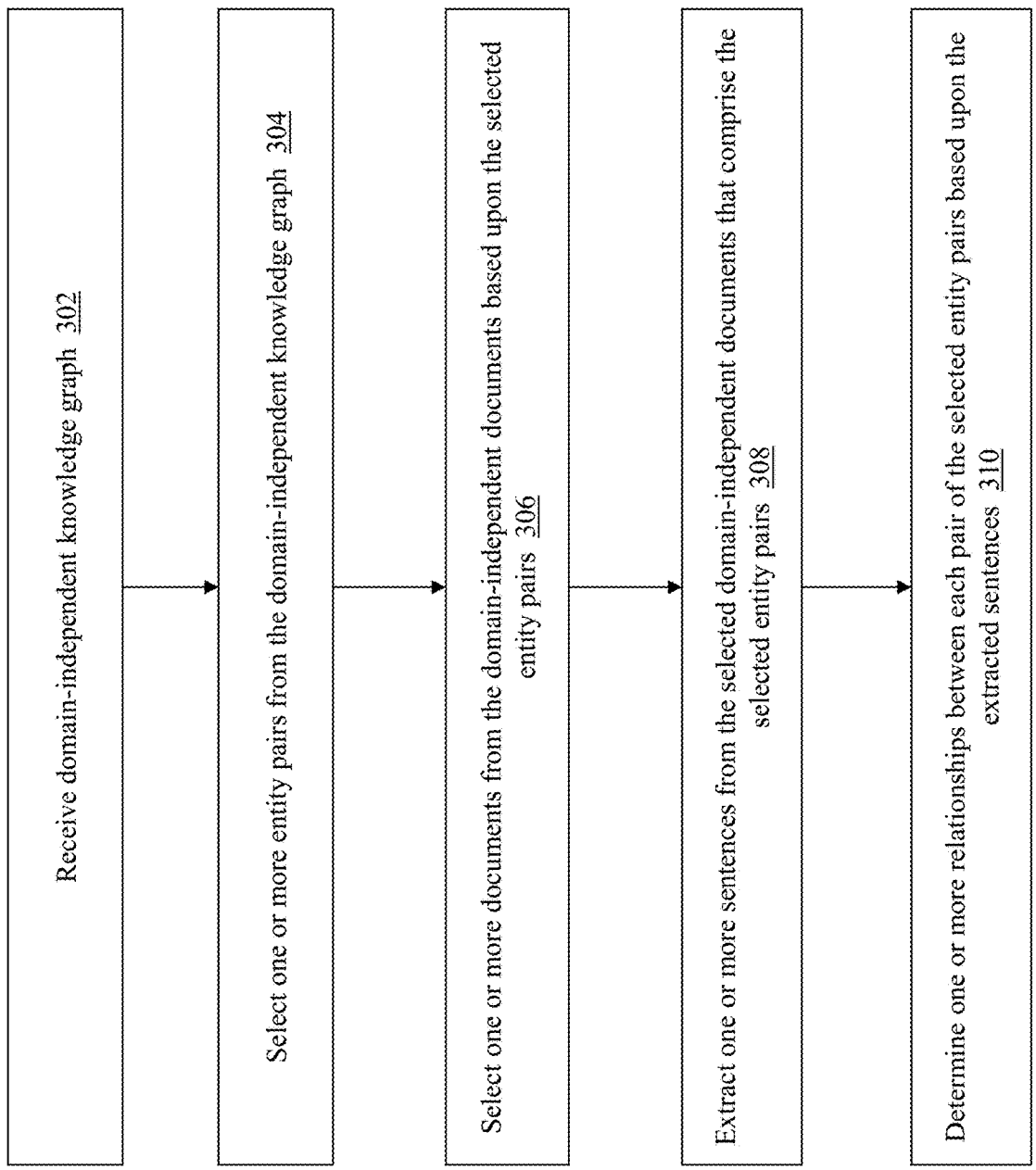
FIG. 3 is a detailed flow diagram of a computerized method of extracting unstructured computer text associated with one or more of the plurality of pairs of entities from at least a portion of the plurality of domain-independent documents.

With respect to the document analysis and entity relationship classification model training phase, the document analysis module 106a extracts (202) unstructured computer text associated with one or more of the plurality of pairs of entities from at least a portion of the plurality of domain-independent documents (i.e., the documents in domain-independent document database 110a). FIG. 3 is a detailed flow diagram of a computerized method 300 of extracting unstructured computer text associated with one or more of the plurality of pairs of entities from at least a portion of the plurality of domain-independent documents. The document analysis module 106a first receives (302) the domain-independent knowledge graph (e.g., the Wikidata knowledge graph) from the knowledge graph database 110c. The document analysis module 106a selects (304) one or more entity pairs from the domain-independent knowledge graph. In one embodiment, the document analysis module 106a receives a plurality of seed entities (e.g., a list of predetermined entities that are relevant to the domain-specific documents) and uses the seed entities to select the entity pairs from the domain-independent knowledge graph. For example, in the case of a financial services domain, the seed entities can comprise a few dozen names of financial entities (such as from Wikidata: Q791974 (mutual fund), Q4201895 (investment fund), Q48996665 (deposit bond), Q15809678 (financial product), Q837171 (financial services), Q14947471 (wealth management), etc.) and the document analysis module 106a can traverse the domain-independent knowledge graph for each of these seed entities to collect all of the related entities (such as Q7887106 (Unit Trust of India), Q18392010 (Fidelity Contrafund), Q5153478 (Common Sense on Mutual Funds: New Imperatives for the Intelligent Investor), Q25245332 (Black Eagle Litigation Fund), Q7685888 (Target Date Fund), etc. are the related entities of Q791974 (mutual fund) when traversing Wikidata) from the domain-independent knowledge graph. Once the module 106a has the related entities, the module 106a can further compile a plurality of pairs of entities from the domain-independent knowledge graph (e.g., an entity pair can comprise two entities that are connected by a relationship in the knowledge graph).

Then, the document analysis module 106a can select (306) one or more documents from the domain-independent documents in the database 110a based upon the selected entity pairs. For example, if the entity pair is <Steve Jobs><Apple>, the document analysis module 106a retrieves a plurality of documents that relate to this entity pair—such as Wikipedia pages describing Apple as a company, Apple products, Steve Jobs biography, etc.

Once the domain-independent documents are selected, the document analysis module 106a extracts (308) one or more sentences from the selected domain-independent documents that comprise the selected entity pairs. In some embodiments, the selected documents are preprocessed (e.g., segmentation, cleaning) to identify specific sentences in each document. Also, in some embodiments, the document analysis module 106a can apply a set of heuristic rules to select more relevant or usable candidate sentences—the heuristic rules can comprise rules such as length of sentence, how many entities are contained in the sentence, how far apart the entity pair occurs in the sentence and the like). Furthermore, the document analysis module 106a can utilize a distant supervision algorithm to select sentences—the distant supervision algorithm selects sentences based upon the assumption that when an entity pair occurs in a sentence, the sentence automatically represents the relationship that the system is interested in learning (such as company founders). An exemplary distant supervision algorithm is described in Mintz, Mike, et al., "Distant supervision for relation extraction without labeled data," *Proceedings of the Joint Conference of the 47th Annual Meeting of the ACL and the 4th International Joint Conference on Natural Language Pro-* cessing of the AFNLP: Volume 2-Volume 2. *Association for Computational Linguistics,* 2009, which is incorporated herein by reference.

Continuing with the above example, if the entity pair is <Steve Jobs><Apple>, the document analysis module 106a can extract a sentence from the domain-independent documents that reads "Steve Jobs was the co-founder and CEO of Apple, Inc."—where the sentence includes each entity in the entity pair and the sentence captures the interested relationship (company founders). However, it should be appreciated that in some embodiments the document analysis module 106a can extract the following sentence from the domain-independent documents: "Steve Jobs passed away the day before Apple unveiled iPhone 4S in late 2011." While this sentence contains the above entity pair, the sentence does not adequately capture the interested relationship. But, the latter sentence is still included in training data for the entity relationship classification model 107a as described below.

The relation extraction module 106b then determines (310) the relationship in each pair of the selected entity pairs based upon the extracted sentences. Because the relationship between a pair of entities can be different based upon a particular context, the relation extraction module 106b can utilize the training data comprising the entity pairs and corresponding sentences to generate predictions of the relationship between the entity pairs based upon the sentences in which the entity pairs appear. This process involves two phases: model training and prediction using the trained model. This process corresponds to step 204 of FIG. 2, where the relation extraction module 106b trains (204) an entity relationship classification model using the domain-independent knowledge graph and the unstructured computer text extracted from the at least a portion of the plurality of domain-independent documents.

Figure 4:
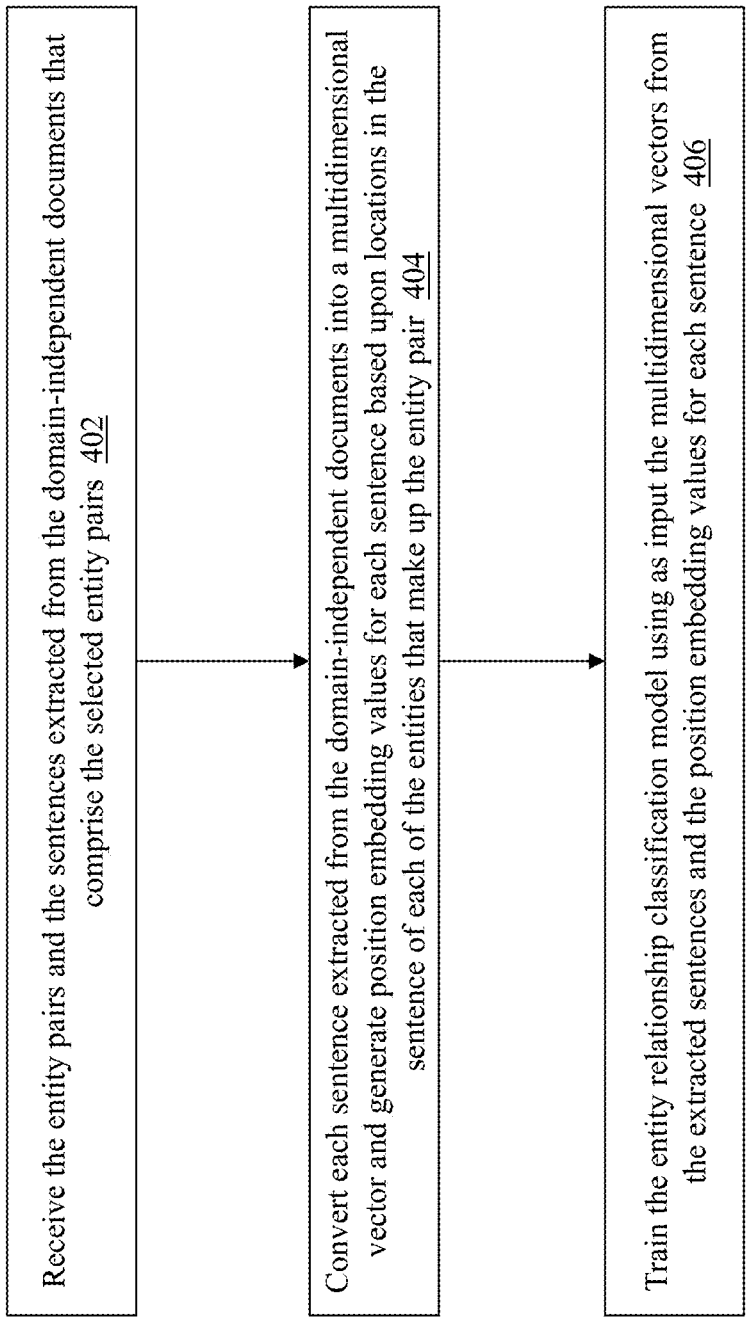
FIG. 4 is a detailed flow diagram of a computerized method of training an entity relationship classification model to determine relationships between each pair of selected entity pairs based upon the extracted sentences.

FIG. 4 is a detailed flow diagram of a computerized method 400 of training an entity relationship classification model to determine relationships between each pair of selected entity pairs based upon the extracted sentences (step 204 of FIG. 2 and step 310 of FIG. 3), using the system 100 of FIG. 1. The relation extraction module 106b of server computing device 106 receives (402) the entity pairs and the corresponding sentences that were extracted from the domain-independent documents, as described above. The relation extraction module 106b converts (404) each sentence into a multidimensional vector and generates position embedding values for each sentence based upon the relative location between each word and the pair of entities in the sentence. For example, the relation extraction module 106b can utilize a word embedding model to generate the multidimensional vectors for each sentence. Exemplary word embedding models include, but are not limited to, Word2Vec (as described in Mikolov, Tomas, et al., "Distributed representations of words and phrases and their compositionality," *Advances in neural information processing systems,* 2013 (incorporated herein by reference)) and fastText (as described in Bojanowski, Piotr, et al., "Enriching word vectors with subword information," *Transactions of the Association for Computational Linguistics* 5, 2017, pp. 135-146 (incorporated herein by reference)). It should be appreciated that in some embodiments, other types of representation models can be used to convert the sentences to multidimensional vectors—such as BERT (as described in Devlin, Jacob, et al., "BERT: Pre-training of deep bidirectional transformers for language understanding," arXiv preprint arXiv:1810.04805, 2018 (incorporated herein by reference)) or GPT (as described in Radford, Alec, et al., "Language models are unsupervised multitask learners," *OpenAI Blog* 1.8, 2019 (incorporated herein by reference)).

In some embodiments, the position embedding values comprise a numeric value that indicates a relative location between each word and the pair of entities in the sentence. In some embodiments, the position embedding initialization values comprise a count of the number of words in the sentence that are between the respective entity words in the pair. The final position embedding values are learned using a neural network. In some embodiments, the position embedding is configured to use sinusoidal position encoding as described in Vaswani, Ashish, et al., "Attention is all you need," *Advances in neural information processing systems,* 2017, which is incorporated herein by reference.

Once the multidimensional vectors for each sentence, and the position embedding values for each entity pair, are generated, the relation extraction module 106b trains (406) the entity relationship classification model 107a using the multidimensional vectors and position embedding values as input to predict relationships between entities in an entity pair. In one embodiment, the entity relationship classification model 107a is configured with an encoding stage and a decoding stage, with the encoding stage using a piecewise convolutional neural network (PCNN). Generally, in this type of relation extraction, the input sentence designated as containing the entity pair only corresponds to a relation type. This means that the entity relationship classification model 107a needs to utilize all local features to make a prediction on the whole sentence level, rather than on each word. As such, a convolutional neural network (CNN) is a natural method to utilize local features and further perform a global prediction on the whole sentence. An exemplary CNN is described in LeCun, Yann, et al., "Gradient-based learning applied to document recognition," *Proceedings of the IEEE* 86.11 (1998): 2278-2324 (which is incorporated herein by reference). However, considering that the structural information of the sentence is naturally divided into three segments (e.g., according to the placement of the entity pair in the sentence), the relation extraction module 106b uses a PCCN. Different from a CNN which use single max pooling, the PCNN uses max pooling on each segmentation of the sentence, as segmented by the entity pair, and this pooling method is called piecewise max pooling. Because PCNN adds sentence structure information in encoding, it improves computational performance of the classification model.

Once the above encoding process occurs, in some embodiments the decoding stage of the entity relationship classification model 107a is a classifier that predicts a relationship of the entity pair in each sentence. However, in most instances, the quality of the training data for relation extraction is low, because as noted above collecting training data for relation extraction is difficult and weak supervision is traditionally used—meaning that the training data can comprise sentences that contain the entity pair but do not also adequately represent the desired relationship. Due to this difficulty, the relation extraction module 106b advantageously uses multi-instance learning (MIL) techniques to overcome the potential mislabeling of the training data—as described in Surdeanu, Mihai, et al., "Multi-instance multi-label learning for relation extraction," *Proceedings of the 2012 joint conference on empirical methods in natural language processing and computational natural language learning,* Association for Computational Linguistics (2012), which is incorporated herein by reference.

To take advantage of MIL, the relation extraction module 106b assigns each sentence to an entity pair bag, e.g., a mechanism to categorize sentences that contain the same entity pair (i.e., with the same predicted relationship). The objective of MIL is to predict a label (e.g., a relationship) for each entity pair bag, rather than predicting a label for each sentence in the entity pair bag. Generally, in MIL only the most likely prediction is used as the prediction result for the entity pair bag. In this way, using MIL to classify the sentences and thereby predict a relationship for the entity pair can avoid the problem of incorrectly-labeled training sentences having an influence on the prediction outcome. Once the relation extraction module 106b has trained the entity relationship classification model 107a as described above, the model 107a can be used to generate a domain-specific knowledge graph—including entities and corresponding relationships between the entities—from unstructured computer text in the relevant domain.

Turning back to FIG. 2, the named entity recognition module 106c extracts (206) the unstructured computer text associated with the first domain from at least a portion of the plurality of domain-specific documents (i.e., from the domain-specific documents contained in the domain-specific document database 110b) and combines the extracted unstructured computer text into a corpus of unstructured computer text for the first domain. Then, the named entity recognition module 106c identifies (208) a plurality of pairs of entities contained within the corpus of unstructured computer text for the first domain, each pair of entities located in one or more sentences of the corpus of unstructured computer text.

Figure 5:
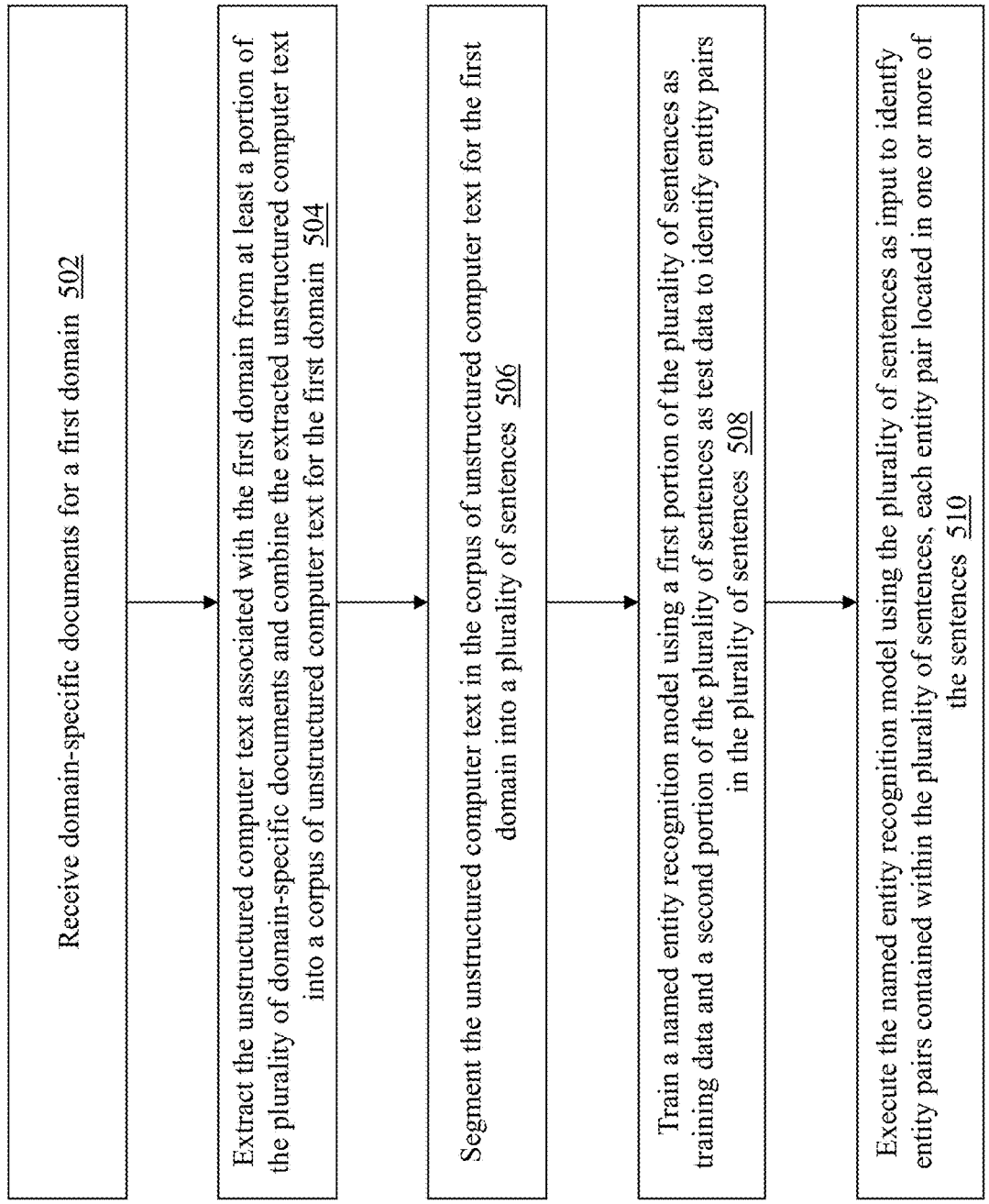
FIG. 5 is a detailed flow diagram of a computerized method of extracting the unstructured computer text associated with the first domain from the domain-specific documents and identifying pairs of entities contained within the corpus of unstructured computer text.

FIG. 5 is a detailed flow diagram of a computerized method 500 of extracting the unstructured computer text associated with the first domain from the domain-specific documents and identifying pairs of entities contained within the corpus of unstructured computer text (steps 206 and 208 of FIG. 2), using the system 100 of FIG. 1. The named entity recognition module 106c receives (502) the domain-specific documents (e.g., from database 110b) for a first domain, and extracts (504) the unstructured computer text associated with the first domain from at least a portion of the domain-specific documents, then combines the extracted unstructured computer text into a corpus of unstructured computer text for the first domain.

Then, the named entity recognition module 106c segments (506) the unstructured computer text in the corpus of unstructured computer text for the first domain into a plurality of sentences. For example, the module 106c can determine one or more initiation characters (e.g., capital letters) and one or more termination characters (e.g., period, exclamation point) that represent the beginning of a sentence and the end of a sentence, respectively. The module 106c can then extract each sentence based upon the positioning of the determined initiation and termination characters for each sentence. In one embodiment, the module 106c uses spaCy (spaCy v. 2.0 available from spacy.io) to segment the text. It should be appreciated that other types of sentence segmentation can be performed within the scope of the technology described herein.

The named entity recognition module 106c then trains (508) a named entity recognition model 107b using a first portion of the plurality of sentences as training data and a second portion of the plurality of sentences as test data to identify entity pairs in the plurality of sentences. Generally, named entity recognition (NER) is a natural language processing (NLP) mechanism that attempts to locate and classify named entity mentions in unstructured computer text into pre-defined categories such as person, product, organization, location, and the like. In some embodiments, the NER model 107b is generated using spaCy (spaCy v. 2.0 available from spacy.io). To train the NER model 107b, the NER module 106c converts each of the sentences segmented from step 506 into multidimensional vectors using, e.g., a word embedding model like Word2Vec or fastText (as referenced previously).

Once the NER model 107b is trained, the NER module 106c executes (510) the NER model 107b using as input the unstructured computer text (e.g., a plurality of sentences) from the corpus of unstructured computer text for the first domain to identify entity pairs contained within the sentences, where each entity pair is located in one or more of the sentences. In some embodiments, the NER model 107b is configured to use a bidirectional long short-term memory (Bi-LSTM) recurrent neural network (RNN) architecture. An exemplary Bi-LSTM architecture is described in Graves, Alex, and Jürgen Schmidhuber. "Framewise phoneme classification with bidirectional LSTM and other neural network architectures," *Neural networks* 18.5-6 (2005): 602-610, which is incorporated herein by reference.

Generally, a neural network (NN) is a computer data model comprising three layers: an input layer, a hidden layer, and an output layer. A recurrent neural network adds recursions (also called loops) in its hidden layer to enable the RNN to process variable length sequences of inputs (such as sentences). However, RNNs can suffer from the problem that the influence of a given input on the hidden layer decays exponentially as it loops—called the vanishing gradient problem. To overcome this, the NER model 107b can use a Bi-LSTM architecture—meaning that two long short term memory models are used, one being fed with input data from beginning to end, and the other being fed with input data from end to beginning. Then, the output of the two LSTM models is connected to generate the features which contain the complete context information for the current word.

In some embodiments, the NER module 106c can then apply a conditional random fields (CRF) technique to the output of the NER model 107b. CRF is a statistical model which is widely used in predicting multiple variables that depend on each other, such as in NER (e.g., a sequence of entity tags). CRF defines a conditional probability distribution $p(y|x)$ over training sequences given a particular observation sequence, rather than a joint distribution $p(y, x)$ over both training and observation sequences. This means that the tag of the word is recognized not only based on its own features, but also based on the tags before and after it. An exemplary CRF technique is described in Lafferty, John, Andrew McCallum, and Fernando C N Pereira, "Conditional random fields: Probabilistic models for segmenting and labeling sequence data," (2001), which is incorporated herein by reference. At this point, using the NER model 107b, the NER module 106c has generated a plurality of entity pairs from the corpus of unstructured computer text for the specific domain and selected the sentences from the corpus of text that contain those entity pairs. Now, these entity pairs and the corresponding sentences can be used as input to the trained entity relationship classification model 107a to predict relationships between the respective entities in each entity pair.

Turning back to FIG. 2, the relation extraction module 106b executes (210) the trained entity relationship classification model 107a to determine a relationship between the entities in each pair of the plurality of pairs of entities identified from the corpus of unstructured computer text for the specific domain (as stored in the domain-specific documents). Once the relationships between the entities in each entity pair are predicted, the module 106b generates (212) a domain-specific knowledge graph using the plurality of entity pairs in the specific domain and the determined relationship.

Figure 6:
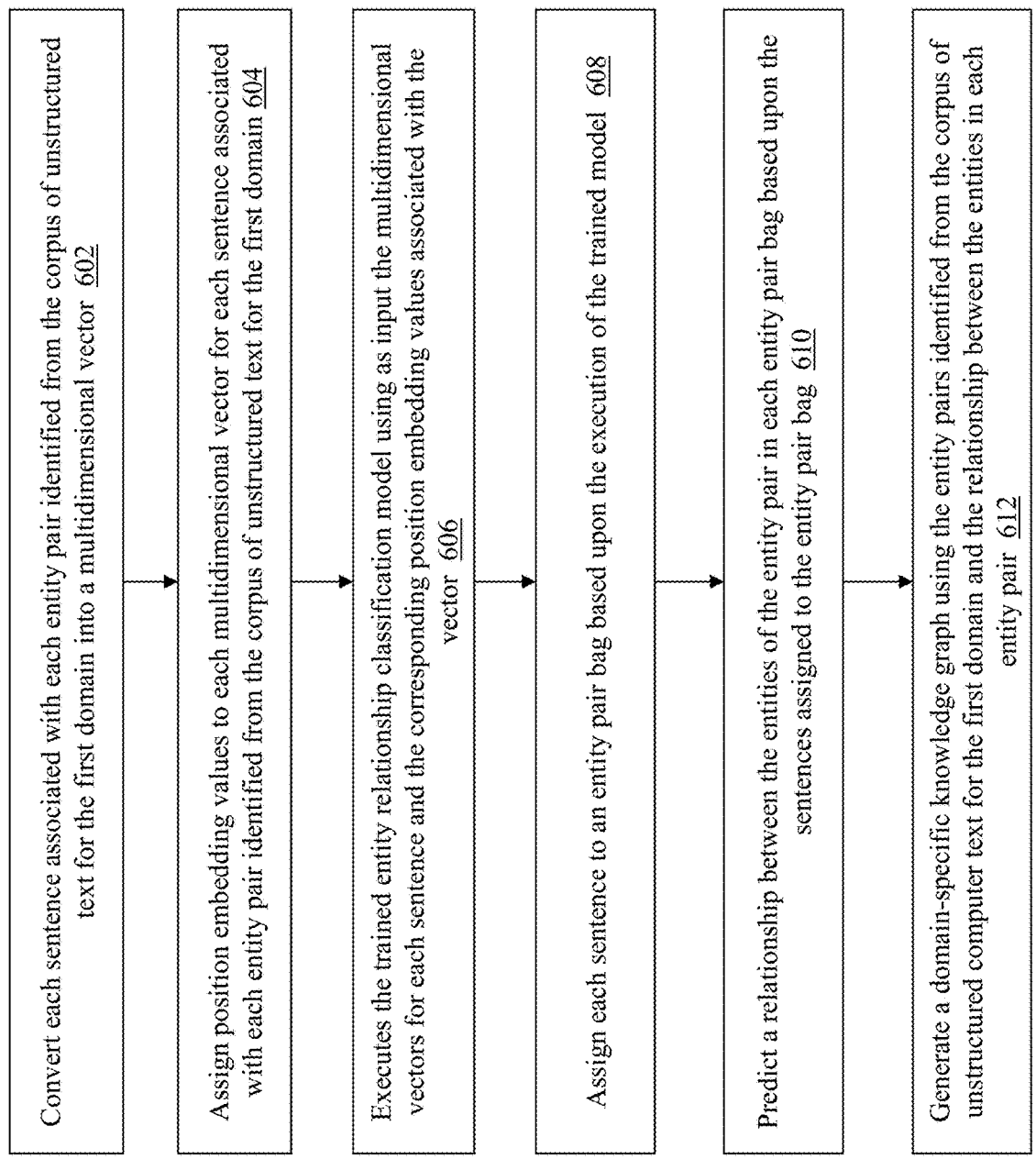
FIG. 6 is a detailed flow diagram of a computerized method of executing the trained entity relationship classification model to determine a relationship between the entities in each entity pair and generating a domain-specific knowledge graph.

FIG. 6 is a detailed flow diagram of a computerized method 600 of executing the trained entity relationship classification model 107b to determine a relationship between the entities in each entity pair (step 210 of FIG. 2) and generating a domain-specific knowledge graph (step 212 of FIG. 2). The relation extraction module 106b converts (602) each input sentence received from the NER module 106c into a multidimensional vector. Similar to the training phase described above with respect to the entity relationship classification model 107b, the relation extraction module 106b converts each sentence into a multidimensional vector using, e.g., a word embedding model such as Word2Vec or fastText, or another type of representation model, such as BERT or GPT. Then, as described above with respect to the model training phase, the relation extraction module 106b assigns (604) position embedding values to each multidimensional vector generated in step 602, the position embedding values based upon the word relative position or location with each entity in the entity pair in the sentence.

Next, the relation extraction module 106b executes (606) the trained entity relationship classification model 107a using as input the above-described multidimensional vectors generated in step 602, and the position embedding values generated in step 604, to predict a relationship for each entity pair. Specifically, as mentioned previously, the trained entity relationship classification model 107a comprises an encoding stage (with a PCNN) and a decoding stage (with a classifier). After execution of the trained entity relationship classification model 107a on the input vectors, the relation extraction module 106b assigns (608) each sentence to one or more different entity pair bags based upon the model execution—for example, if the sentence contains three entity pairs, the sentence is assigned to three entity pair bags. As mentioned above with respect to the model 107a training, the relation extraction module 106b determines the entity pair contained in each sentence and assigns the sentences that comprise the same entity pair to an entity pair bag. Using the entity pair bags, the relation extraction module 106b predicts (610) a relationship between the entities of the entity pair in each entity pair bag based upon the sentences assigned to the bag. In some embodiments, the relation extraction module 106b can generate a score for each predicted relationship for each entity pair, and establish a threshold to select the most likely relationship for the entity pair—for example, the relation extraction module 106b can be configured with a threshold to select the predicted relationship with the highest prediction score as the relationship for the entity pair.

Once the relation extraction module 106b has determined the predicted relationship for each entity pair as described above, the module 106b generates (612) a domain-specific knowledge graph using the entity pairs identified from the corpus of unstructured computer text for the specific domain and the relationship between the entities in each entity pair. For example, the relation extraction module 106b can store each entity pair and relationship in the knowledge graph database 110c in the following data format:

<Ent$_s$, r, Ent$_t$> where Ent$_s$ is the first entity, r is the relationship, and Ent$_t$ is the second entity. A example from a financial services domain might be:

<SIMPLE IRA, instance_of, IRA>

Figure 7:
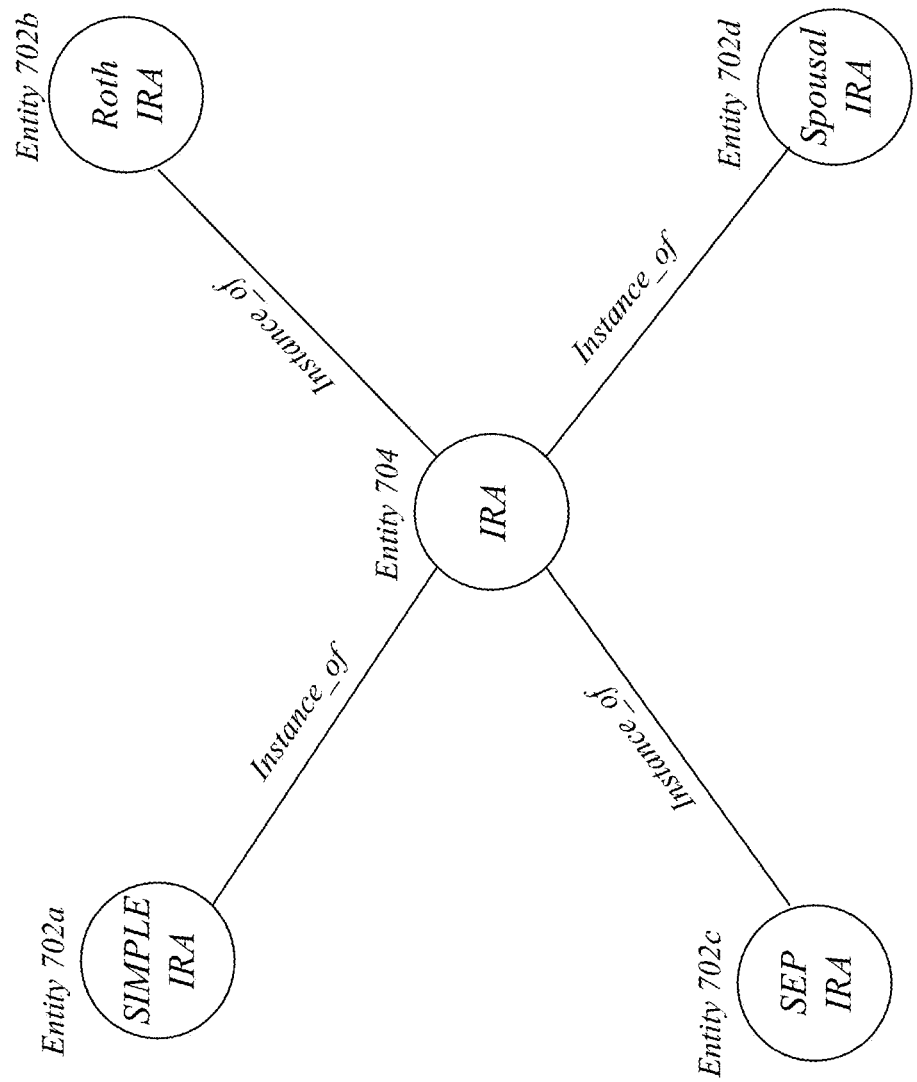
FIG. 7 is a diagram of an exemplary domain-specific knowledge graph generated by the relation extraction module.

The relation extraction module 106b can combine many of these entity pair/relationship data structures to form a domain-specific knowledge graph. FIG. 7 is a diagram of an exemplary domain-specific knowledge graph 700 generated by the relation extraction module 106b. As shown in FIG. 7, certain entities 702a, 702b, 702c, 702d (or nodes) of the graph 700 are specific types of individual retirement accounts (IRAs)—for example, SIMPLE IRA, Roth IRA, SEP IRA, and Spousal IRA. Each of these nodes 702a-702d is joined by a relationship (or edge, represented by the arrows) to entity 704, which is a type-agnostic IRA. Each relationship is defined as instance_of, because based upon the domain-specific documents, the relation extraction module 106b determine that the entities 702a-702b are each instances of (e.g., specific versions of) entity 704.

In some embodiments, the knowledge graph 700 can be stored in database 110c as four different data elements, as follows:

<SIMPLE IRA, instance_of, IRA>
<Roth IRA, instance_of, IRA>
<SEP IRA, instance_of, IRA>
<Spousal IRA, instance_of, IRA>

The relation extraction module 106b can analyze each of these data elements to generate the multidimensional data structure shown in FIG. 7. It should be appreciated that the example provided in FIG. 7 is relatively simple due to the limitations of depicting more than two dimensions on a drawing sheet. However, it should be appreciated that the domain-specific knowledge graph in some embodiments can comprise a plurality of dimensions, with entities connected to many different entities by virtue of different relationships determined by the system 100.

After the domain-specific knowledge graph has been generated and stored in knowledge graph database 110c, the web server 108 can utilize the knowledge graph to respond to user inquiries received from client devices 102, 103. As mentioned previously, in one example a user at client device 102 can execute an app installed on the client device to initiate a text chat session with automated agent module 108a of web server 108—e.g., for the purpose of asking questions and obtaining information from the automated agent module 108a. In one embodiment, the automated agent module 108a can be a chatbot program that is configured to receive text messages from an app on client devices 102, 103, analyze the received text messages to determine an appropriate response, and automatically generate a text message that responds to the client message(s). In some cases, the automated agent module 108a can communicate with the content retrieval module 108b to identify and retrieve relevant digital content (documents, articles, webpages, etc.) that are responsive to the text messages received from the client devices 102, 103. The automated agent module 108a can identify particular keywords, entities, or concepts in the client text messages and then traverse the domain-specific knowledge graph generated by the system 100 to determine other entities in the knowledge graph that share a relationship to the identified keywords, entities or concepts. Using these determined relationships, the content retrieval module 108b can access the domain-specific database 110b to retrieve digital content that encapsulates or relates to the entities and their relationships, and return the digital content to the automated agent module 108a for transmission to the client devices 102, 103 in response to a text message. For example, the automated agent module 108a can respond to the client devices 102, 103 with a text message containing a hyperlink that points to a web address containing the relevant digital content for download to and display on the client devices 102, 103.

Figure 8A:
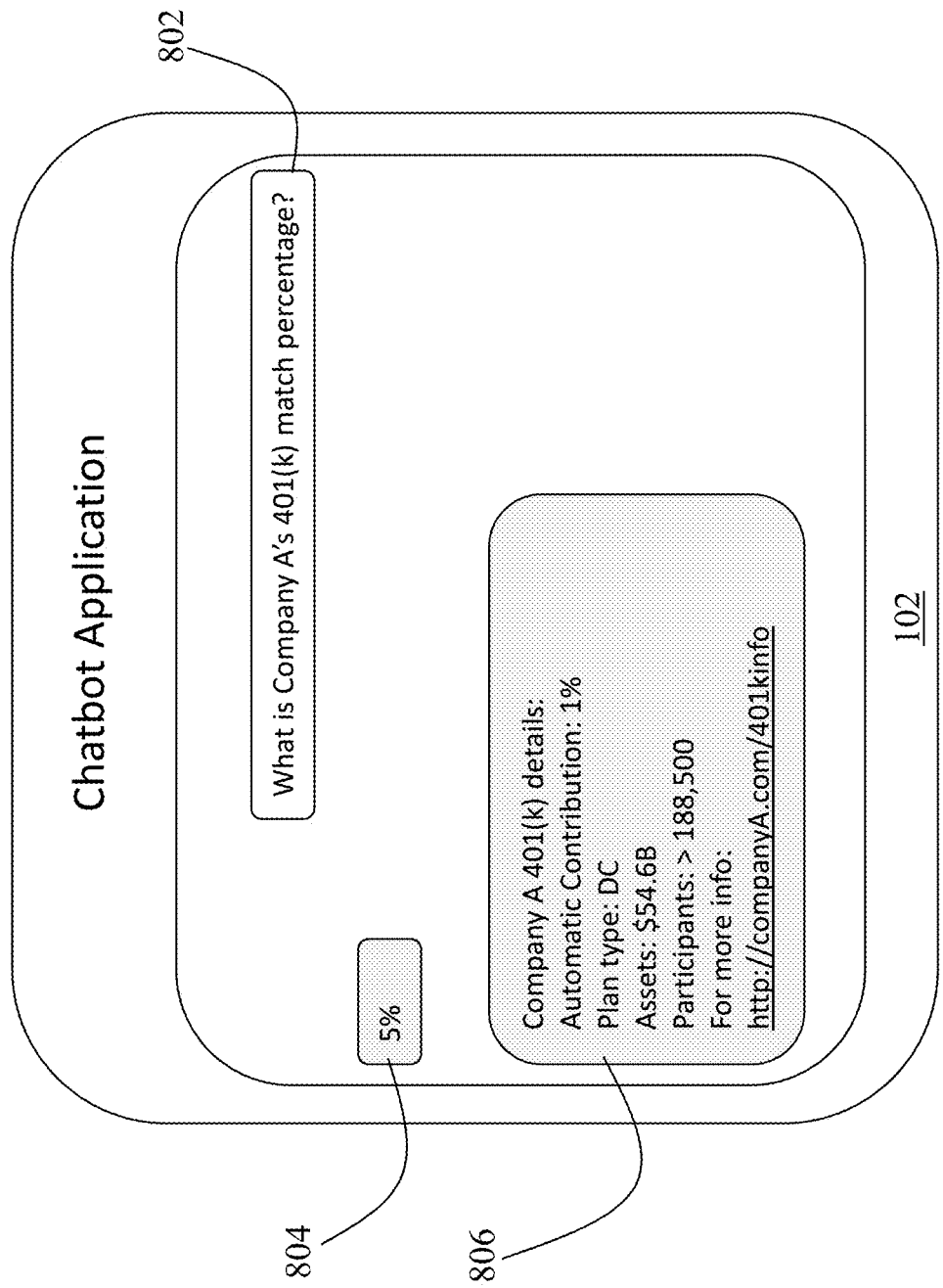
FIG. 8A is an exemplary user interface diagram of a chatbot application that can utilize a domain-specific knowledge graph to respond to client device text messages.
Figure 8B:
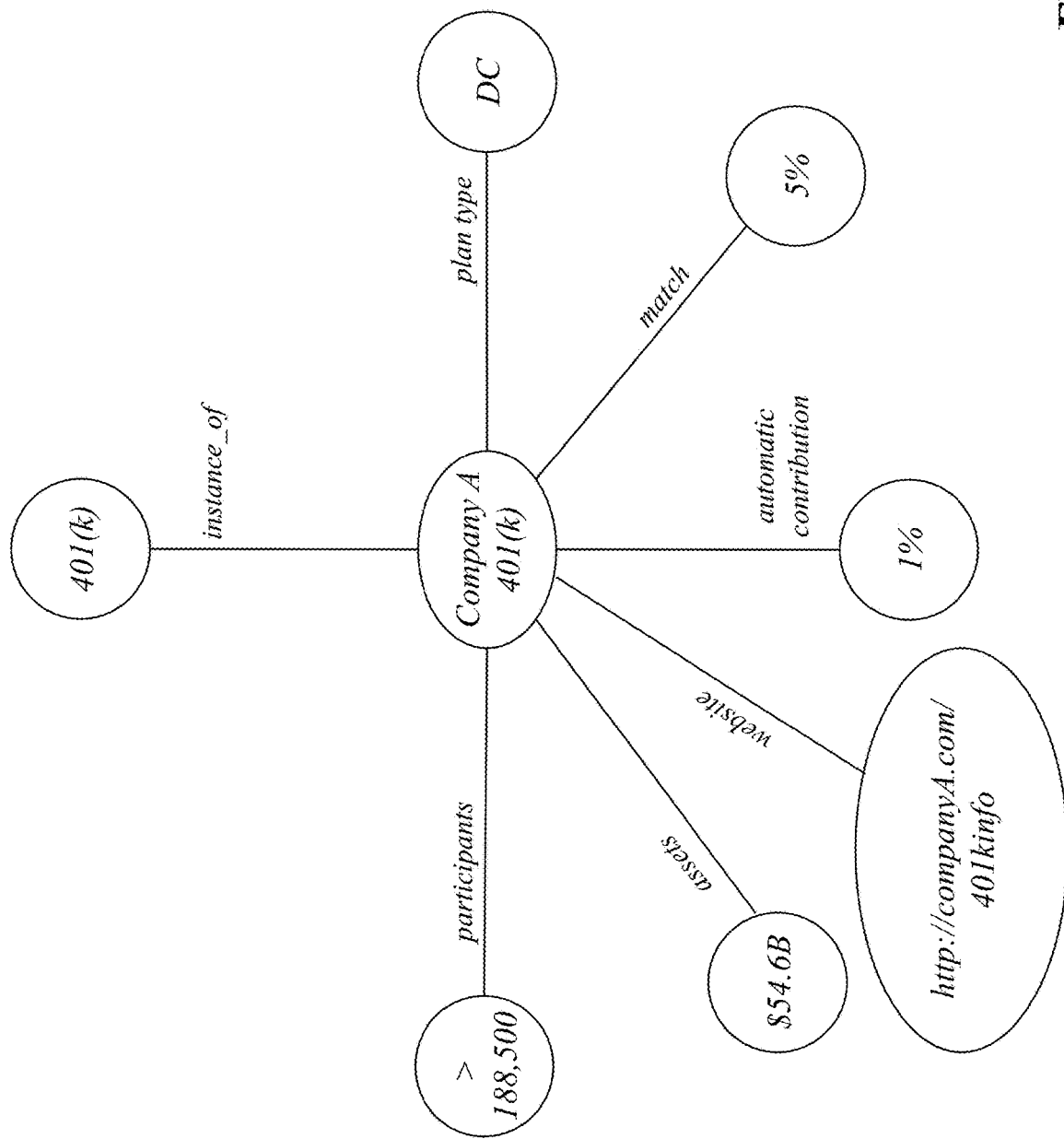
FIG. 8B is an exemplary domain-specific knowledge graph used by the chatbot application of FIG. 8A.

FIG. 8A is an exemplary user interface diagram of a chatbot application that can utilize a domain-specific knowledge graph to respond to client device text messages, and FIG. 8B is an exemplary domain-specific knowledge graph used by the chatbot application of FIG. 8A. As shown in FIG. 8A, a user at client device 102 can launch a chatbot application which establishes a text-based communication session with automated agent module 108*a* of web server 108. The user types in a message 802: "What is Company A's 401(k) match percentage?"

The automated agent module 108*a* parses the text message to extract several keywords that are relevant to responding to the user's inquiry: <Company A>, <401(k)>, <match percentage>. The automated agent module 108*a* transmits these keywords to the content retrieval module 108*b*, which uses the keywords to traverse the domain-specific knowledge graph 808 of FIG. 8B to identify specific information that is responsive to the user's request. As shown in FIG. 8B, the domain-specific knowledge graph 808 comprises a plurality of entities, with Company A 401(k) as the central entity connected to the other entities via a relationship. In determining the answer to the user's inquiry, the content retrieval module 108*b* first locates the Company A 401(k) node in the knowledge graph and traverses the match edge to determine that the match percentage for Company A's 401(k) plan is 5%.

In addition, the content retrieval module 108*b* can traverse one or more other edges that are connected to the central node to collect other information about Company A's 401(k) plan, including items such as number of participants, amount of assets, plan type, automatic contribution percentage, and a hyperlink to the Company A 401(k) plan website. The content retrieval module 108*b* can transmit the information obtained from the domain-specific knowledge graph 808 to the automated agent module 108*a*, which forms a responsive text message (i.e., message 804 in FIG. 8A) that contains the match percentage, and also forms a second text message (i.e., message 806) that contains the additional information obtained from the knowledge graph. In this way, the system 100 can utilize the domain-specific knowledge graph to quickly determine not only answers to user inquiries, but also other information and documents that may be pertinent to the user's request.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for generating a domain-specific knowledge graph from unstructured computer text for use in a conversation service application, the system comprising:
   a computer data store including (i) a plurality of domain-specific documents, each document comprising unstructured computer text associated with a first domain (ii) a domain-independent knowledge graph comprising a plurality of pairs of entities, each pair including a relationship between the entities in the pair, and (iii) a plurality of domain-independent documents, each document comprising unstructured computer text associated with one or more of the plurality of pairs of entities; and
   a computing device coupled to the computer data store, the computing device comprising a memory that stores computer-executable instructions and a processor that executes the computer-executable instructions to:
      extract the unstructured computer text associated with one or more of the plurality of pairs of entities from at least a portion of the plurality of domain-independent documents;
      train an entity relationship classification model using the domain-independent knowledge graph and the unstructured computer text extracted from the at least a portion of the plurality of domain-independent documents, the entity relationship classification model configured to identify entity relationships contained in input data received by the model,
         wherein the entity relationship classification model comprises an encoder and a decoder, and training includes encoding, at the encoder using a piecewise convolutional neural network, segmentations of sentences of the unstructured computer text as segmented by the associated pair of entities and assigning, at the decoder, each encoded sentence of the unstructured computer text to an entity pair bag and predicting a relationship classification for each entity pair bag;
      extract the unstructured computer text associated with the first domain from at least a portion of the plurality of domain-specific documents and combine the extracted unstructured computer text into a corpus of unstructured computer text for the first domain;
      identify, using a named entity recognition model, a plurality of pairs of entities contained within the corpus of unstructured computer text for the first domain, each pair of entities located in one or more sentences of the corpus of unstructured computer text;
      execute the trained entity relationship classification model, with input of (i) the plurality of pairs of entities identified from the corpus of unstructured computer text for the first domain and (ii) the sentences for each of the plurality of pairs of entities identified from the corpus of unstructured computer text for the first domain, to determine a relationship between the entities in each pair of the plurality of pairs of entities identified from the corpus of unstructured computer text for the first domain;
      generate a domain-specific knowledge graph using (i) the plurality of pairs of entities identified from the corpus of unstructured computer text for the first domain and (ii) the relationship between the entities in each pair of the plurality of pairs of entities identified from the corpus of unstructured computer text for the first domain,
      the domain-specific knowledge graph comprising a multidimensional data structure where:
         each entity in the plurality of pairs of entities identified from the corpus of unstructured computer text for the first domain is a node in the domain-specific knowledge graph, and
the relationship between the entities in each pair the plurality of pairs of entities identified from the corpus of unstructured computer text for the first domain is a connection between the nodes for those entities in the domain-specific knowledge graph;
establish a chat-based communication session between a conversation service software application of the computing device and a remote computing device;
capture a user message generated by a user of the remote computing device during the chat-based communication session;
traverse the domain-specific knowledge graph using one or more keywords extracted from the first message to identify a first data element in the knowledge graph that is responsive to the user message and one or more second data elements in the knowledge graph that are related to the first data element;
generate (i) a first responsive message containing the first data element and (ii) a second responsive message containing the second data elements, wherein at least one of the first data element or the second data elements comprises a hyperlink that points to a web address containing digital content; and
transmit the first responsive message and the second responsive message to the remote computing device for display to the user during the chat-based communication session,
wherein the hyperlink is activated at the remote computing device to establish a connection to a web server at the web address for retrieval and display of the digital content on the remote computing device alongside the conversation service software application.

2. The system of claim 1, wherein extracting the unstructured computer text associated with one or more of the plurality of pairs of entities from at least a portion of the plurality of domain-independent documents comprises segmenting each document in the at least a portion of the plurality of domain-independent documents into a plurality of sentences.

3. The system of claim 2, wherein training the entity relationship classification model using the domain-independent knowledge graph and the unstructured computer text extracted from the at least a portion of the plurality of domain-independent documents comprises:
selecting seed entities from the domain-independent knowledge graph;
identifying a plurality of pairs of entities from the domain-independent knowledge graph using the seed entities;
capturing sentences from the plurality of domain-independent documents that are associated with the identified plurality of pairs of entities from the domain-independent knowledge graph;
determining a relationship between entities in each pair of the identified plurality of pairs of entities from the domain-independent knowledge graph based upon the captured sentence from the plurality of domain-independent documents that is associated with the pair; and
training the entity relationship classification model using as input (i) the identified plurality of pairs of entities from the domain-independent knowledge graph, (ii) the determined relationships in each pair of the identified plurality of pairs of entities from the domain-independent knowledge graph, and (iii) captured sentences from the plurality of domain-independent documents that are associated with the identified plurality of pairs of entities from the domain-independent knowledge graph.

4. The system of claim 3, wherein capturing sentences from the plurality of domain-independent documents is based upon a distant supervision algorithm.

5. The system of claim 1, wherein extracting the unstructured computer text associated with the first domain from at least a portion of the plurality of domain-specific documents comprises segmenting each document in the at least a portion of the plurality of domain-specific documents into a plurality of sentences.

6. The system of claim 1, wherein identifying, using the named entity recognition model, a plurality of pairs of entities contained within the corpus of unstructured computer text for the first domain comprises:
converting, by a word embedding layer of the named entity recognition model, each word of the sentences of the corpus of unstructured computer text for the first domain into a multidimensional vector in a multidimensional vector space comprising a plurality of nodes, each node in the multidimensional vector space corresponding to a word from the corpus of unstructured computer text for the first domain; and
classifying, by a recurrent neural network of the named entity recognition model, one or more of the multidimensional vectors of the multidimensional vector space as an entity.

7. The system of claim 6, wherein the recurrent neural network of the named entity recognition model comprises a bi-directional long short-term memory (Bi-LSTM) layer.

8. The system of claim 7, wherein the named entity recognition model comprises a conditional random fields (CRF) layer that adjusts the entity classification applied by the recurrent neural network to one or more of the multidimensional vectors.

9. The system of claim 1, wherein executing the trained entity relationship classification model to determine a relationship between the entities in each pair of the plurality of pairs of entities identified from the corpus of unstructured computer text for the first domain comprises:
converting, by an embedding layer of the encoder of the trained entity relationship classification model, each sentence for each of the plurality of pairs of entities identified from the corpus of unstructured computer text for the first domain into a multidimensional vector;
assigning, by the embedding layer, a position embedding value to each multidimensional vector associated with each sentence for each of the plurality of pairs of entities identified from the corpus of unstructured computer text for the first domain, the position embedding value associated with a location of the pair of entities in the sentence;
calculating, by the piecewise convolutional neural network of the encoder of the trained entity relationship classification model, one or more features of each sentence identified from the corpus of unstructured computer text for the first domain based upon the multidimensional vector and position embedding values associated with the sentence;
assigning, by the decoder of the trained entity relationship classification model, each sentence to an entity pair bag based upon the calculated features of the sentence; and predicting, by the decoder, a relationship of each entity pair bag based upon the sentences assigned to the entity pair bag.

10. The system of claim 9, wherein predicting a relationship of each entity pair bag based upon the sentences assigned to the entity pair bag comprises:
generating, by the decoder, a score associated with the relationship of an entity pair; and
assigning, by the decoder, the relationship of the entity pair based upon the score.

11. A computerized method of generating a domain-specific knowledge graph from unstructured computer text for use in a conversation service application, the method comprising:
storing, in a computer data store, (i) a plurality of domain-specific documents, each document comprising unstructured computer text associated with a first domain (ii) a domain-independent knowledge graph comprising a plurality of pairs of entities, each pair including a relationship between the entities in the pair, and (iii) a plurality of domain-independent documents, each document comprising unstructured computer text associated with one or more of the plurality of pairs of entities;
extracting, by a computing device coupled to the computer data store, the unstructured computer text associated with one or more of the plurality of pairs of entities from at least a portion of the plurality of domain-independent documents;
training, by the computing device, an entity relationship classification model using the domain-independent knowledge graph and the unstructured computer text extracted from the at least a portion of the plurality of domain-independent documents, the entity relationship classification model configured to identify entity relationships contained in input data received by the model, wherein the entity relationship classification model comprises an encoder and a decoder, and training includes encoding, at the encoder using a piecewise convolutional neural network, segmentations of sentences of the unstructured computer text as segmented by the associated pair of entities and assigning, at the decoder, each encoded sentence of the unstructured computer text to an entity pair bag and predicting a relationship classification for each entity pair bag;
extracting, by the computing device, the unstructured computer text associated with the first domain from at least a portion of the plurality of domain-specific documents and combine the extracted unstructured computer text into a corpus of unstructured computer text for the first domain;
identifying, by the computing device using a named entity recognition model, a plurality of pairs of entities contained within the corpus of unstructured computer text for the first domain, each pair of entities located in one or more sentences of the corpus of unstructured computer text;
executing, by the computing device, the trained entity relationship classification model, with input of (i) the plurality of pairs of entities identified from the corpus of unstructured computer text for the first domain and (ii) the sentences for each of the plurality of pairs of entities identified from the corpus of unstructured computer text for the first domain, to determine a relationship between the entities in each pair of the plurality of pairs of entities identified from the corpus of unstructured computer text for the first domain; and
generating, by the computing device, a domain-specific knowledge graph using (i) the plurality of pairs of entities identified from the corpus of unstructured computer text for the first domain and (ii) the relationship between the entities in each pair of the plurality of pairs of entities identified from the corpus of unstructured computer text for the first domain,
the domain-specific knowledge graph comprising a multidimensional data structure where:
each entity in the plurality of pairs of entities identified from the corpus of unstructured computer text for the first domain is a node in the domain-specific knowledge graph, and
the relationship between the entities in each pair the plurality of pairs of entities identified from the corpus of unstructured computer text for the first domain is a connection between the nodes for those entities in the domain-specific knowledge graph;
establishing, by the computing device, a chat-based communication session between a conversation service software application of the computing device and a remote computing device;
capturing, by the computing device, a user message generated by a user of the remote computing device during the chat-based communication session;
traversing, by the computing device the domain-specific knowledge graph using one or more keywords extracted from the first message to identify a first data element in the knowledge graph that is responsive to the user message and one or more second data elements in the knowledge graph that are related to the first data element;
generating, by the computing device, (i) a first responsive message containing the first data element and (ii) a second responsive message containing the second data elements, wherein at least one of the first data element or the second data elements comprises a hyperlink that points to a web address containing digital content; and
transmitting, by the computing device, the first responsive message and the second responsive message to the remote computing device for display to the user during the chat-based communication session;
wherein the hyperlink is activated at the remote computing device to establish a connection to a web server at the web address for retrieval and display of the digital content on the remote computing device alongside the conversation service software application.

12. The method of claim 11, wherein extracting the unstructured computer text associated with one or more of the plurality of pairs of entities from at least a portion of the plurality of domain-independent documents comprises segmenting each document in the at least a portion of the plurality of domain-independent documents into a plurality of sentences.

13. The method of claim 12, wherein training the entity relationship classification model using the domain-independent knowledge graph and the unstructured computer text extracted from the at least a portion of the plurality of domain-independent documents comprises:
selecting seed entities from the domain-independent knowledge graph;
identifying a plurality of pairs of entities from the domain-independent knowledge graph using the seed entities;

capturing sentences from the plurality of domain-independent documents that are associated with the identified plurality of pairs of entities from the domain-independent knowledge graph;

determining a relationship between entities in each entity pair of the identified plurality of pairs of entities from the domain-independent knowledge graph based upon the captured sentence from the plurality of domain-independent documents that is associated with the pair; and training the entity relationship classification model using as input (i) the identified plurality of pairs of entities from the domain-independent knowledge graph, (ii) the determined relationships in each pair of the identified plurality of pairs of entities from the domain-independent knowledge graph, and (iii) captured sentences from the plurality of domain-independent documents that are associated with the identified plurality of pairs of entities from the domain-independent knowledge graph.

14. The method of claim 13, wherein capturing sentences from the plurality of domain-independent documents is based upon a distant supervision algorithm.

15. The method of claim 11, wherein extracting the unstructured computer text associated with the first domain from at least a portion of the plurality of domain-specific documents comprises segmenting each document in the at least a portion of the plurality of domain-specific documents into a plurality of sentences.

16. The method of claim 11, wherein identifying, using the named entity recognition model, a plurality of pairs of entities contained within the corpus of unstructured computer text for the first domain comprises:

converting, by a word embedding layer of the named entity recognition model, each word of the sentences of the corpus of unstructured computer text for the first domain into a multidimensional vector in a multidimensional vector space comprising a plurality of nodes, each node in the multidimensional vector space corresponding to a word from the corpus of unstructured computer text for the first domain; and classifying, by a recurrent neural network of the named entity recognition model, one or more of the multidimensional vectors of the multidimensional vector space as an entity.

17. The method of claim 16, wherein the recurrent neural network of the named entity recognition model comprises a bi-directional long short-term memory (Bi-LSTM) layer.

18. The method of claim 17, wherein the named entity recognition model comprises a conditional random fields (CRF) layer that adjusts the entity classification applied by the recurrent neural network to one or more of the multidimensional vectors.

19. The method of claim 11, wherein executing the trained entity relationship classification model to determine a relationship between the entities in each pair of the plurality of pairs of entities identified from the corpus of unstructured computer text for the first domain comprises:

converting, by an embedding layer of the encoder of the trained entity relationship classification model, each sentence for each of the plurality of pairs of entities identified from the corpus of unstructured computer text for the first domain into a multidimensional vector;

assigning, by the embedding layer, a position embedding value to each multidimensional vector associated with each sentence for each of the plurality of pairs of entities identified from the corpus of unstructured computer text for the first domain, the position embedding value associated with a location of the pair of entities in the sentence;

calculating, by the piecewise convolutional neural network of the encoder of the trained entity relationship classification model, one or more features of each sentence identified from the corpus of unstructured computer text for the first domain based upon the multidimensional vector and the position embedding value associated with the sentence;

assigning, by the decoder of the trained entity relationship classification model, each sentence to an entity pair bag based upon the calculated features of the sentence; and predicting, by the decoder, a relationship of each entity pair bag based upon the sentences assigned to the entity pair bag.

20. The method of claim 19, wherein predicting a relationship of each entity pair bag based upon the sentences assigned to the entity pair bag comprises:

generating, by the decoder, a score associated with the relationship of an entity pair; and assigning, by the decoder, the relationship of the entity pair based upon the score.

* * * * *